April 5, 1932. P. BURKE 1,852,289
POWER SHOVEL
Filed June 27, 1929 2 Sheets-Sheet 1
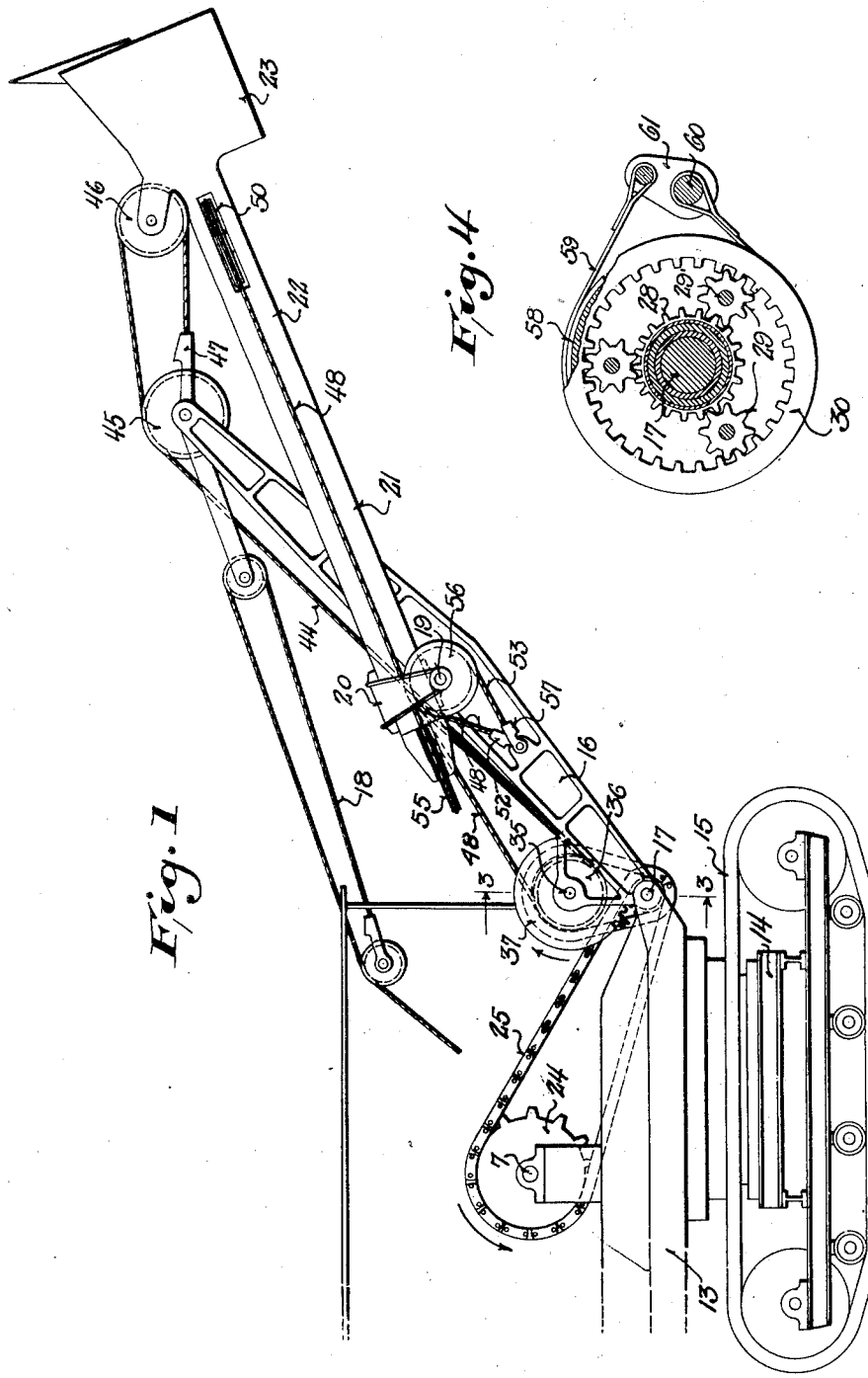

April 5, 1932.  P. BURKE  1,852,289
POWER SHOVEL
Filed June 27, 1929   2 Sheets-Sheet 2
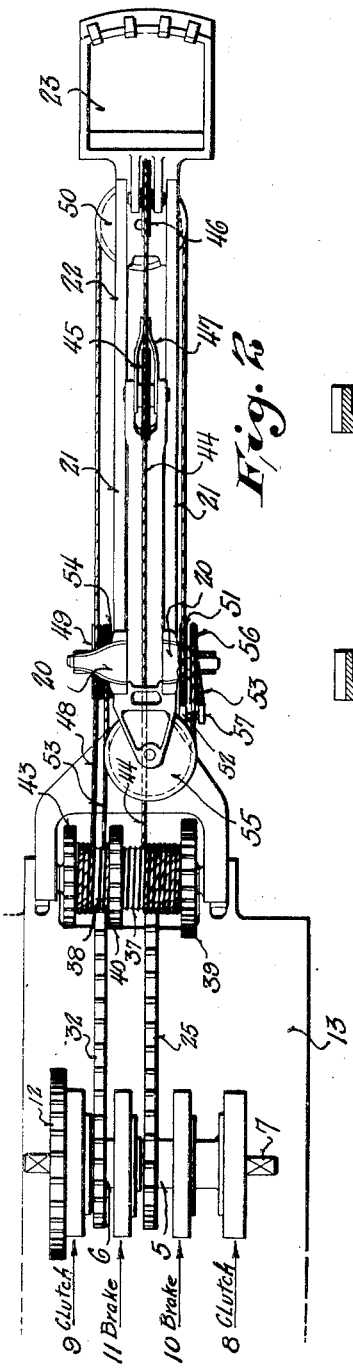
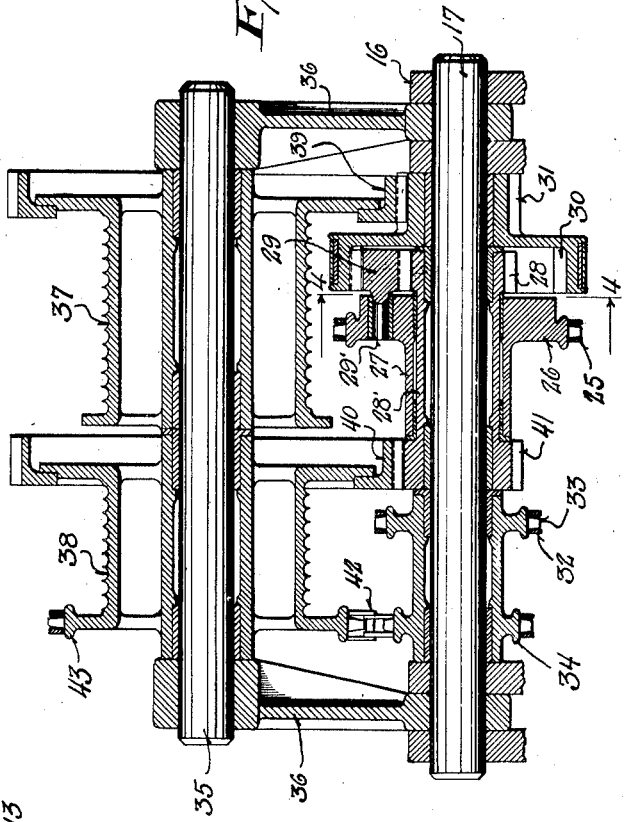
Inventor
Paul Burke
By Quarles & French
Attorneys Patented Apr. 5, 1932

1,852,289

UNITED STATES PATENT OFFICE

PAUL BURKE, OF GREEN BAY, WISCONSIN, ASSIGNOR TO NORTHWEST ENGINEERING CORPORATION, OF GREEN BAY, WISCONSIN, A CORPORATION OF WISCONSIN

POWER SHOVEL

Application filed June 27, 1929. Serial No. 374,211.

The invention relates to power shovels and more particularly to shovels wherein the dipper and its stick are shifted relative to the supporting boom to crowd the dipper into the material and are swung upwardly during the digging operation.

In the class of excavating machines there is a type now commonly called the rope-thrusting type, in which the dipper and its stick, either directly or through geared shipper shaft mechanism, is thrust outwardly by cables, simultaneously with hoisting or digging, without the expenditure of additional engine power for the thrusting operation. So far as I am aware, all shovels of the above described type utilize either a bight of the hoisting line or its dead end as a portion of the thrusting means. The object of the present invention is to provide a power shovel of the above general type that accomplishes the thrusting simultaneously with hoisting or digging without additional engine power for the thrusting operation, which does not require that a bight or the dead end of the hoisting cable be employed for thrusting.

A further object of the invention is to provide a power shovel of the form described with control mechanism for effecting an additional thrusting effect on the dipper stick when required, as in the extension of the dipper beyond the boom for facilitating dumping.

The invention further consists in the several features hereinafter set forth and more particularly defined by claims at the conclusion hereof.

In the drawings Fig. 1 is a side elevation view of a power shovel embodying the invention;

Fig. 2 is a plan view of the shovel and its drive connections;

Fig. 3 is a detail sectional view taken on the line 3—3 of Fig. 1;

Fig. 4 is a detail sectional view taken on the line 4—4 of Fig. 3.

Referring to Figs. 1 and 2, the numerals 5 and 6 designate independent drums mounted on a common shaft 7 and driven therefrom by connection therewith by separately controlled clutches 8 and 9 and restrained from movement by separately controlled brakes 10 and 11, said shaft carrying a gear 12 adapted for connection by appropriate drive with any suitable prime mover. These drums are shown as mounted on the rotating base 13 upon which the prime mover is also mounted, said base being mounted on a travelling base 14 equipped with endless propelling treads 15 driven by suitable connection with the prime mover.

A boom 16 is pivotally connected to the base 13 by a hinge-pin 17 and is supported at varying inclinations by a cable 18 connecting the outer end portion of the boom with the framework of the machine in known manner.

A shipper shaft 19 is mounted on the boom intermediate its ends and carries suitable saddle blocks 20 in which the spaced parts 21 of a divided dipper stick or handle 22 are mounted to slide, said dipper stick carrying a dipper 23 of known construction equipped with digging teeth and a rear dumping door whose details are not shown as they are well known in this art.

Drum 5 carries a chain sprocket 24 connected by chain 25 to a sprocket 26 whose hub 27 is rotatably mounted upon the sleeve hub portion 28' of a pinion 28 which in turn is revolubly mounted on the hinge-pin 17. The sprocket 26 has suitably journalled in it radially disposed, laterally extending shafts 29', each having a pinion 29 meshing with the teeth of the pinion 28 and also with the teeth of an internal gear 30 having a pinion 31 formed integral therewith and journalled on the hinge-pin 17.

The drum 6 carries a sprocket, similar to the sprocket 24, and connected by chain 32 with a driven sprocket 33 formed integral with another sprocket 34 and both journalled on hinge-pin 17.

A shaft 35 is journalled in spaced brackets 36, shown as a part of the boom, and has drums 37 and 38 loosely mounted thereon. A spur gear 39, bolted to the drum 37, meshes with the pinion 31 and a spur gear 40, bolted to the drum 38, meshes with a pinion 41 formed integral with the part 28, while a chain 42 connects the sprocket 34 with a sprocket 43 formed on the outside flange of the drum 38.

Wound upon the drum 37 is the hoisting cable 44 which extends therefrom to boom point sheave 45, thence around padlock sheave 46 on the dipper and back to a pivotal dead end connection 47 on the boom, or, in case of a single or odd number line reeving, on the dipper.

Upon the drum 38 is wound the back-haul cable 48 which extends therefrom over a sheave 49 on the shipper shaft, thence down around back-haul sheave 50, back to shipper shaft sheave 51 and thence to its dead end on the boom at 52. Also wound on drum 38, but in the opposite direction, is the crowding cable 53 which passes therefrom to shipper shaft sheave 54, thence around the sheave 55 mounted on the inner end of the dipper stick and thence around shipper shaft sheave 56 to a dead end on the boom at 57.

Instead of the cables 48 and 53 being directly connected with the dipper stick, it will be understood that where the dipper stick is provided with racks meshing with pinions on the shipper shaft that such cables may be associated with drums, either on the shipper shaft or in geared connection therewith in a manner known to this art and hence not specifically illustrated here.

The internal gear 30 has a brake drum portion 58 formed thereon on which a brake band 59 is mounted, one end of the band being mounted on a shaft 60 associated in any suitable manner with the framework of the machine and the other end being connected to a lever 61 pivoted on said shaft and operable by any suitable means to tension said band.

With this construction, when the drum 5 is rotated in a counter-clockwise direction, as noted in Fig. 1, and the brake 11 is set on drum 6, sprockets 33 and 34 cannot rotate and so the drum 38 remains stationary so that outward translation of the dipper stick cannot occur. Drum 5, however, through the chain 25 turns the sprocket 26 and as the pinion 29 is held stationary, through the holding of gears 41 and 28 by the then stationary gear 40 on drum 38, the planetary pinions 29 rotate about pinion 30, whereby all rotation of the sprocket 26 is thus transmitted to the internal gear 30 which in turn, through gears 31 and 39, drives the hoist drum 37 and the winding up of the hoist line 44 on the drum will cause the dipper and its stick to swing about the shipper shaft 19 as a center.

Meanwhile, however, though the setting of the brake 11 on the drum 6 prevents outward translation of the dipper stick, pinions 29 impress as much tendency toward rotation of the gear 28 and sleeve 28' and pinion 41 as upon the internal gear 30 so that there is a strong tendency to rotate gear 40 and hence drum 38 in a direction to wind in on cable 53 and thus move the dipper stick outwardly.

If then the brake 11 on drum 6 is released, this outward translation tendency will be free to act and the dipper stick will be free to move outward except as limited by the material being dug and thus outward thrusting may occur simultaneously with hoisting without expenditure of additional engine power. For a given torque imparted by the power means to sprocket hub 26 and its hub 27, the pressures exerted by the teeth of pinion 29 upon those of gear 30 and upon those of pinion 28 would be the same whether actual motion is taking place or not, that is to say, whether the dipper stick is free to translate or is restrained by the joint or separate effect of application of brake 11 and presence of solid material at the dipper teeth, the tooth pressure at gear 30, and consequently, the tension in hoisting cable 44 will be the same for a given torque applied to sprocket hub 27 and providing brake 59 be released.

For inward translation of the dipper stick it is merely necessary to apply clutch 9 to the drum 6, thus imparting an anti-clockwise rotation to sprocket-driving chain 32 and sprockets 33 and 34, chain 42 and sprocket 43 and hence a similar rotation to drum 38, thus turning the drum to wind up the back-haul cable 48 and effect an inward translation of the dipper stick 22 while paying out the thrust cable 53.

Thus the usual operations heretofore accomplished by either the direct and indirect connection of the outer end of the hoist cable or a bight of the hoist cable intermediate its ends with the dipper stick to effect outward translation of the dipper stick is effected by the present arrangement by means which are entirely independent of the disposition of the dead end of the hoisting cable or of any bight intermediate its ends.

It is also to be noted that with the dipper supported by the hoisting cable 44 and the brake 10 set, the tension in the hoisting cable 44, required to support the dipper and stick, will exert a rotational tendency on drum 37 acting through the planetary gearing and tending to rotate drum 38 in a direction to wind in the thrusting cable 53, thus tending to move the dipper and stick outwardly.

Now if the brake 59 be applied to brake drum 58, thus preventing rotation of the gear 30 and hence gears 31, 39 and drum 37, all motion of sprocket 26 through rotation by driving drum 5 will go into the rotation of pinion 41 and gear 40 to drive drum 38 in a clockwise direction, thus paying out back-haul cable 48 and winding in on the thrusting cable 53 which, acting through the pulley 55 upon the inner end of the dipper stick, causes an outward translation thereof.

Likewise, a partial engagement of the brake band 59 may be used to effect a reduced hoisting and a certain amount of outward thrusting.

While the brake 10 on the drum 5 is set, rapid alternations of clutching the drum 6 and engagement of the brake 59, thereby effecting rapid inward and outward translations of the dipper stick, is of advantage in effecting a shaking of the dipper 23 for effecting the dislodgment of sticky material which may be contained therein.

Where the brake 59 is applied with drum 5 in operation, the whole power of the engine being available to effect an outward translation of the dipper stick when the dipper is in a raised position, it will be noted that the dipper under these conditions can be moved beyond the boom for efficiently discharging its load.

I desire it to be understood that this invention is not to be limited to any particular form or arrangement of parts except insofar as such limitations are included in the claims.

What I claim as my invention is:

1. In a power shovel, the combination of a boom, a dipper and dipper handle mounted on the boom for swinging and shifting movements relative thereto, means for effecting hoisting of the dipper, means including a planetary gearing for effecting outward translation of the dipper, and means for arresting outward translation of the dipper, the two first-named means being operatively connected to each other so that force tending to hoist the dipper will remain unchanged irrespective of whether the second or third-named means is effective.

2. In a power shovel, the combination of a boom, a dipper and dipper handle mounted on the boom for swinging and shifting movements relative thereto, a hoisting drum, a hoisting cable associated with said drum, boom and dipper and having a dead end distinct from the inner end of the dipper handle, a second drum, a thrust cable distinct from said hoist cable, on said drum associated with the dipper handle, and planetary gearing means connecting said drums together whereby said second drum is operated without diminishing the turning movement applied to the hoisting drum.

3. In a power shovel, the combination of a boom, a dipper and dipper handle mounted on the boom for swinging and shifting movements relative thereto, a hoisting drum, a cable for hoisting the dipper, a second drum, a cable for thrusting the dipper outwardly associated with said second drum, and a planetary gearing connection between said drums for effecting simultaneous action of said cables without diminishing the force available for hoisting.

4. In a power shovel, the combination of a boom, a dipper and dipper handle mounted on the boom for swinging and shifting movements relative thereto, a hoisting drum, a cable associated with said drum for hoisting the dipper, a second drum, a thrusting cable on said second drum for effecting outward translation of the dipper and its handle, a backhaul cable on said second drum for retracting the dipper, power means for driving said second drum in a direction to retract the dipper, means for driving said second drum in a direction to translate the dipper outwardly, said last named means operating under the torque imposed thereon through the tension of the hoisting cable.

5. In a power shovel, the combination of a boom, a dipper and dipper handle mounted on the boom for swinging and shifting movements relative thereto, a hoisting drum, a cable associated with said drum for hoisting the dipper, a second drum, means for driving said hoisting drum, planetary gear means, a thrusting cable on said second drum for effecting outward translation of the dipper on the rotation of said drum through said planetary gearing, and means for controlling said planetary gearing and preventing its action on said hoisting drum while permitting its action on said second drum.

6. In a power shovel, the combination of a boom, a dipper and dipper handle mounted on the boom for swinging and shifting movements relative thereto, a hoisting drum, a cable associated with said drum for hoisting the dipper, a second drum, means for driving said hoisting drum, a planetary gearing between said drums including an orbit gear associated with said hoisting drum, a thrusting cable on said second drum for effecting outward translation of the dipper on the rotating of said drum through said planetary gearing, and brake means for said orbit gear for varying or stopping its rotational movement.

7. In a power shovel, the combination of a boom, a dipper and dipper handle mounted on the boom for swinging and shifting movements relative thereto, a hoisting drum, a dipper-hoisting cable associated with said drum, boom, and dipper, a second drum, independently controlled means for driving said drums, a planetary gearing between said drums, a thrusting cable on said second drum for effecting outward translation of the dipper on the rotation of said drum through said planetary gearing, and a back-haul cable on said second drum for effecting inward translation of the dipper when said drum is rotated by its own independently controlled drive means.

8. In a power shovel, the combination of a boom, a dipper and dipper handle mounted on the boom for swinging and shifting movements relative thereto, a hoisting drum, a dipper-hoisting cable associated with said drum, boom, and dipper, a second drum, a planetary gearing connection between said drums, means for driving said hoisting drum through said planetary gearing, a thrusting cable on said second drum for effecting outward translation of the dipper on the rotation of said drum through said planetary gearing, means for preventing or retarding rotation of said hoisting drum by said planetary gearing, a back-haul cable mounted on said second drum for retracting the dipper, and separately controlled means for driving said second drum in a direction to wind in said back-haul cable.

9. In a power shovel, the combination of a boom, dipper and dipper handle mounted on the boom for swinging and shifting movements relative thereto, means for effecting hoisting of the dipper, means for effecting outward translation of the dipper, a source of power, and planetary gearing mechanism operatively connected to said means for effecting proportional division of the effort derived from the source of power as between the said means.

10. In a power shovel, the combination of a boom, a dipper and dipper handle mounted on the boom for swinging and shifting movements relative thereto, a hoisting drum, a cable for hoisting the dipper, a second drum, a cable for thrusting the dipper outwardly associated with said second drum, and a gearing connection between said drums for effecting simultaneous action of said cables without diminishing the force available for hoisting including a gear operatively connected to said hoisting drum, a gear operatively connected to said second drum, and a drive gear meshing with both of said gears and movable with and relative to said gears.

11. In a power shovel, the combination of a boom, a dipper and dipper handle mounted on the boom for swinging and shifting movements relative thereto, means for hoisting the dipper, means for thrusting the dipper and its handle outwardly, a gearing connection between said hoisting means and said thrusting means for effecting simultaneous action thereof without diminishing the force available for hoisting including gear members respectively connected with said hoisting means and said thrusting means, and a drive gear meshing with said gear members and movable with and relative to said gear members.

In testimony whereof, I affix my signature.

PAUL BURKE.